Jan. 25, 1966  C. R. CEDERGREEN  3,231,010
APPARATUS FOR HANDLING FROZEN FOODS
Filed Feb. 18, 1963  3 Sheets-Sheet 1
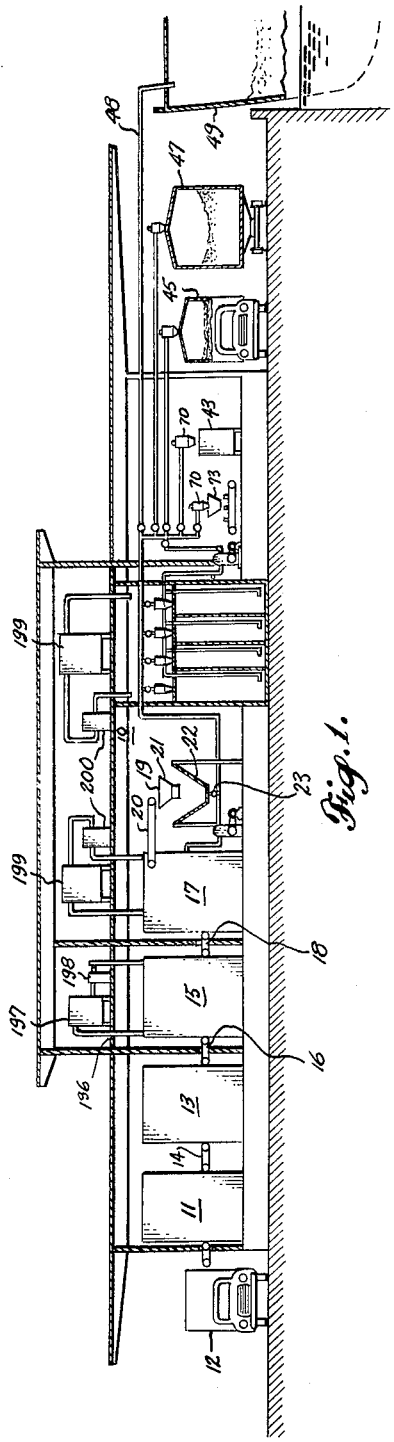
INVENTOR.
CLARICE R. CEDERGREEN
BY
ATTORNEY

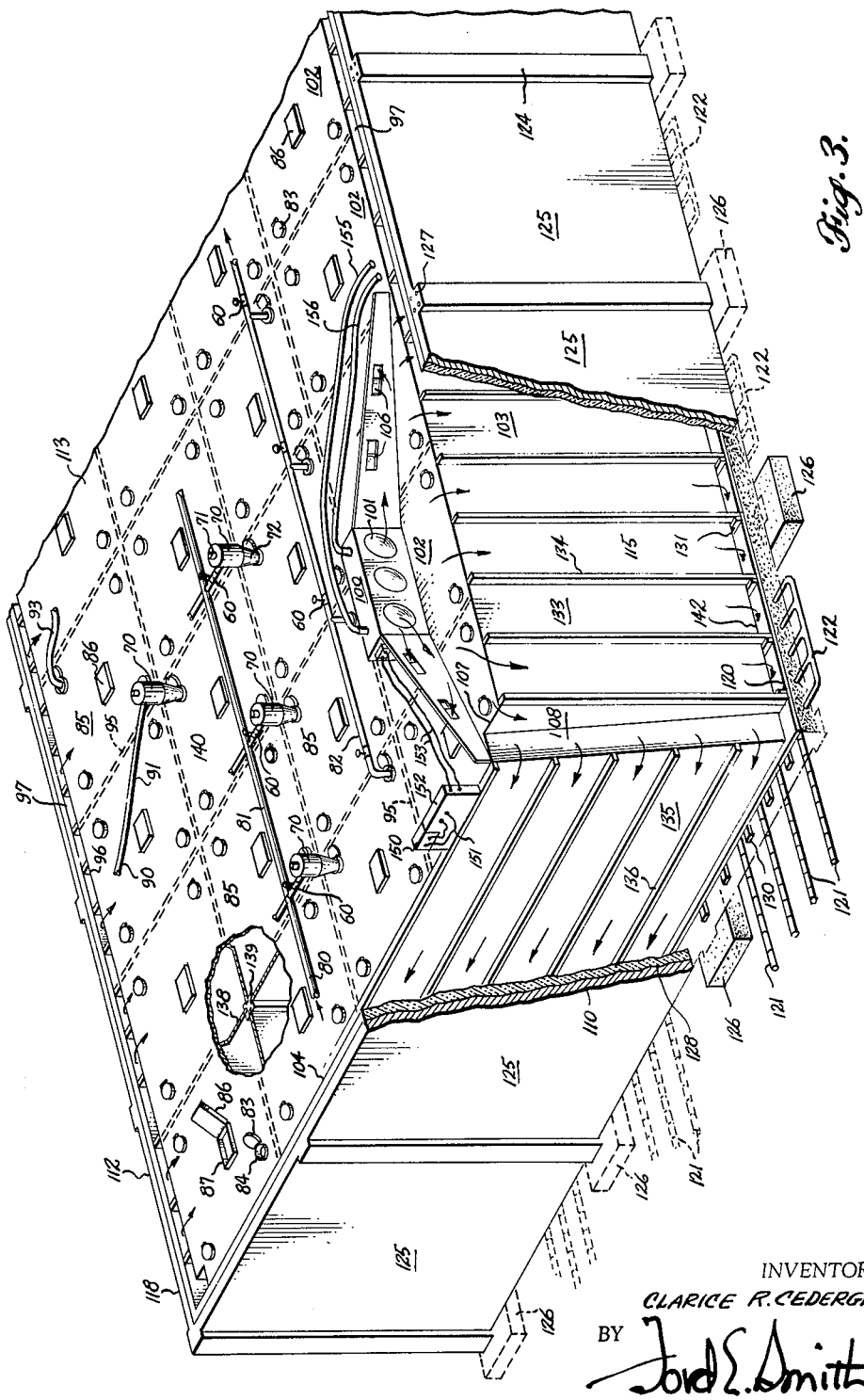

Jan. 25, 1966   C. R. CEDERGREEN   3,231,010
APPARATUS FOR HANDLING FROZEN FOODS
Filed Feb. 18, 1963   3 Sheets-Sheet 3
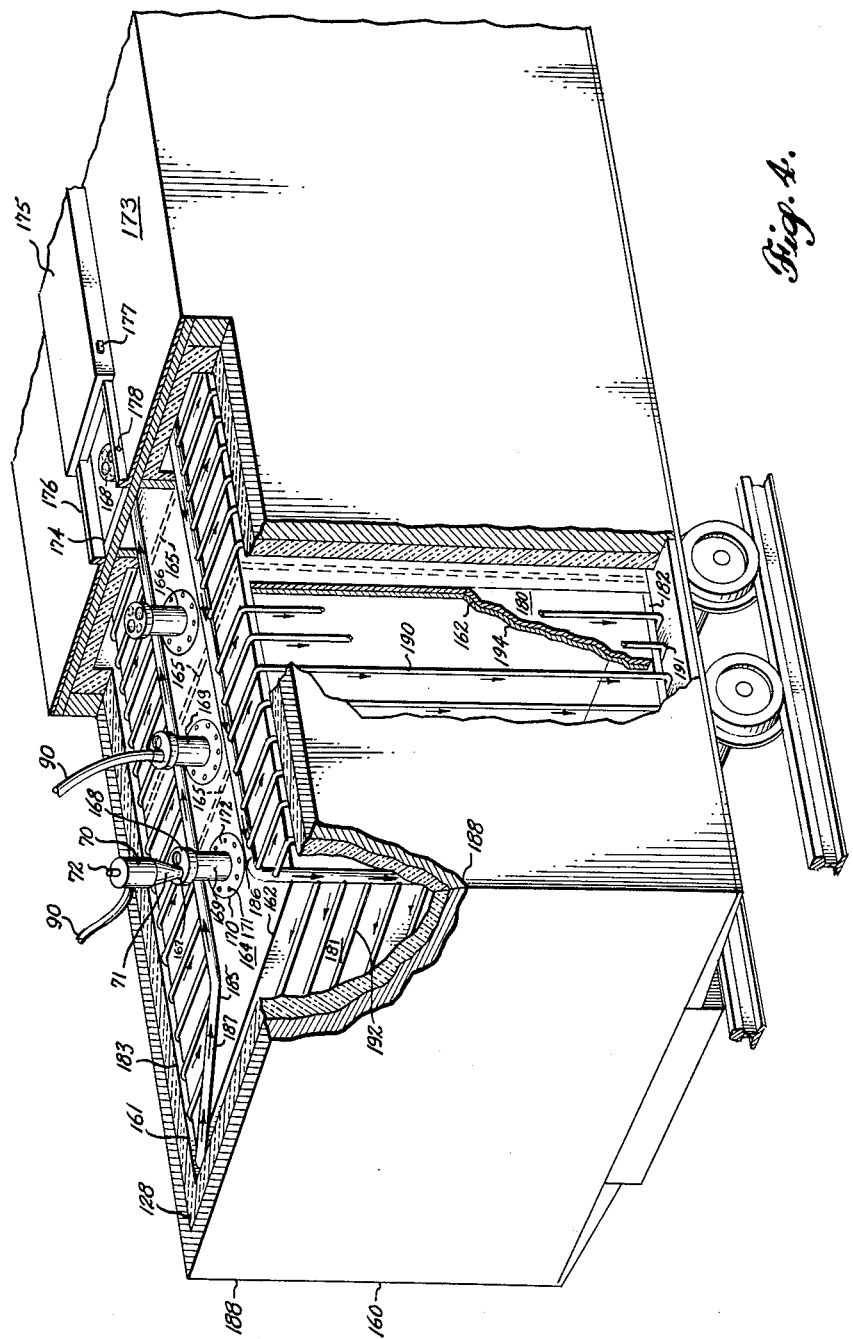
INVENTOR.
CLARICE R. CEDERGREEN
BY
ATTORNEYS

United States Patent Office 3,231,010
Patented Jan. 25, 1966

3,231,010
APPARATUS FOR HANDLING FROZEN FOODS
Clarice R. Cedergreen, P.O. Box 151, Snohomish, Wash.
Filed Feb. 18, 1963, Ser. No. 259,302
10 Claims. (Cl. 165—48)

This invention relates to frozen food processing plant methods and apparatus and to the continuing handling, storing and transportation of the processed frozen foods. Each year as the food crop is harvested, frozen food processing plants are operated at their maximum capacity. It is customary for the processed frozen foods, for the most part, to be retained within the facilities of the frozen food processing plant awaiting subsequent orders which arrive throughout the following year. Such orders usually call for delivery of frozen food products in several unit quantities or in bulk. Because of the storage time involved between processing and shipment and the uncertainties of the market demand, and packaging variations which follow, the management of a frozen food processing plant is faced with the problem of what to do with its products during the interim period preceding shipment to customers.

Generally today the bulk frozen food product is either processed and immediately packed into small marketable units and thereafter stored or the bulk frozen food product is placed in interim portable tote boxes or containers which are moved by plant personnel into and out of warehouse facilities. These procedures involve considerable expense because: much labor is required; the initial unit packages oftentimes are of an undesired size or inappropriately labelled to fill subsequent orders, and the interim storage containers oftentimes do not satisfactorily maintain the complete frozen food product in the best of condition when placed in a frozen food storage warehouse.

This invention, therefore, has the purpose of providing means and methods for utilization both in conjunction with frozen food processing plants and the follow-on transportation facilities which make it possible for the managers of such processing plants and transportation facilities to reduce by a large amount their present handling and storage costs and spoiled product losses.

Objectives of the invention are: to handle foods quickly and conveniently at lower cost in positive and/or negative fluid pressure conveying systems; to distribute frozen foods through such fluid pressure conveying systems selectively filling specific market size packages, or bulk storage bins of trucks, trains, airplanes and ships, or interim bulk storage bins of buildings, at all times having the option of avoiding costs of interim packaging, handling, storage and logistic problems associated therewith; and to store bulk frozen foods, during any interim between initial processing and final delivery, in either stationary or movable freezer bin facilities which are constructed, maintained and operated at low cost.

The invention, briefly described and expressed in selective method terms, comprises: unloading bulk foods from field-to-processing plant carrying means into processing plant conveying means; conveying the bulk foods through the food preparation stations of the processing plant; cleaning foods; inspecting, and/or grading bulk foods; heating, as necessary, bulk foods for blanching and like purposes; pre-cooling, as necessary, bulk foods; freezing the bulk foods within controlled temperature freezers; distributing the frozen bulk foods by operating pressure systems selectively conveying the frozen bulk foods from freezers to: in-plant and near-plant stationary storage units of multiple bins; in-plant mixing, filling and packaging rooms, and near-plant transportation storage units of multiple bins; redistributing the frozen bulk foods by operating pressure systems selectively conveying the frozen bulk foods from in-plant and near-plant stationary storage units of multiple bins to: in-plant mixing, filling and packaging rooms, and near-plant transportation storage units of multiple bins; sealing bins of the in-plant, near-plant stationary storage units and transportation storage units; opening limited size accesses to the sealed bins while filling and withdrawing bulk frozen foods through the pressure distribution systems operating at either positive or negative pressure, and refrigerating and circulating fluids completely and continuously within enveloping spaces defined by closely adjacent outer structure arranged around groups of bulk frozen food bins in respective storage units.

In the drawings an embodiment of a frozen food processing plant is shown in the section view of FIGURE 1. Some in-plant components specifically used in handling and storage of bulk frozen foods are shown in greater detail in FIGURE 2. An embodiment of stationary storage facilities is illustrated in FIGURE 3 and an embodiment of movable storage facilities adapted to a railway car is shown in FIGURE 4, both storage facilities being constructed to contain free flowing bulk frozen foods.

In FIGURE 1 the interior of a frozen food processing plant 10 is shown commencing with delivery of the food product harvest from farms and brought to receiving area operations 11 by delivery vehicles 12 which are designed for easy loading in fields and convenient unloading at receiving areas. The unprocessed food is moved to cleaning and grading areas 13 on conveyors 14. Cleaning and grading operations are handled in conventional manner, with cleaning generally being handled with the aid of fluids. Thereafter the clean product is moved on to a blanching facility 15 on conveyors 16 when the product is a food type requiring an initial heating operation, such as peas and corn. Thereafter blanched foods, or other foods not requiring blanching, are directed to the freezing area 17 on conveyors 18. Following freezing of the product the free flowing frozen food items are delivered to a weighing station 19 by conveying means 20. The frozen food is funneled, 21, into a hopper 22 where unit quantities are collected by weighing means 23 and the amounts are recorded.

The free flowing frozen food items are thereafter discharged from the weighing hopper 22 into a positive or negative pressure fluid conveying system 30. At the outset the system is generally pressurized as it is located by the discharge from the weighing chamber 22. This pressurized portion 31 of system 30 is pressurized by using a motor driven pump 32. Relief valves 34 are located throughout the system.

The frozen food items are conveyed within conduits 35 of the pressure system, and depending on the valve system of remaining portions of pressure system 31, frozen food items are directed optionally to:

(a) Final packaging equipment 40 when current orders are available for designated commercial units, such as one and two pound packages 41;

(b) Directly to other container filling equipment 42 designed to fill larger package units 43 marketable to institutional and restaurant users of frozen foods;

(c) To filling equipment 44 discharging the free flowing food products into trucks;

(d) To filling equipment 46 discharging into trains;

(e) To filling equipment 48 discharging into marine vessels 49; and (f) To various stationary bins 50, 51, 52, 53 through their respective filling means 54, 55, 56 and 57.

The ultimate place of deposit of frozen food items leaving weighing hopper 22 and passing through the pressure distribution system 31 is determined by the setting of various flow control valves which are generally designated by numeral 60. However, once free flowing bulk frozen food items are deposited in the various bins 50, 51, 52, 53, the pressure system is generally no longer useful when a distribution system is arranged as illustrated in FIGURES 1 and 2. Thereafter, if at a later date following the height of the season and process time, or at any time, when food products are to be removed from these bins, a vacuum system 63 forming part of the general handling system 30 is relied upon for withdrawal of food products. Throughout this system, valves 64 serve to control the specific application point of a vacuum system in respective bins. Each bin is equipped with a discharge pipe 65 running to the bin bottom. Motor 68 driven air pump 69 draws vacuum on the system and is equipped to discharge food products into the pressure system discussed previously.

Throughout the filling operation at the ultimate point of depositing the free flowing frozen foods into the confining storage compartments like bin 50, the fluid flow separators 70 are utilized wherein fluid is discharged at 71 in one direction and food products are discharged at 72 in the opposite direction. In certain locations an additional funneling means 73 may be found to be necessary.

Stationary storage facility

As will be noted in FIGURE 3, the fluid positive or negative fluid pressure conveying system is installed on either a permanent basis or a portable basis within a stationary storage facility. A permanent distribution system 80, having a pressure portion 81 of such system permanently arranged about multiple bins 85, is installed as the basis of a highly automated system. Likewise, negative pressure portions 82 of the system 80 are located above various similar bins 85. Each bin has its internal discharge conduit 65, small top hatch 83, covered opening 84 and larger man size hatch covers 86 over entrances 87. On the other hand, however, where automation is not deemed necessary, a system 90 is utilized wherein pressure conduits 91 and vacuum conduits 93 are movable about overhead space above bins 85 for entry and removal with respect to the hatches 83.

In the embodiment of this stationary storage shown in FIGURE 3, respective bins 85 are closely grouped together with common wall sections 95 wherever possible. The other sections 96, whether they be bottom, top or side are located adjacently to a space 97 which completely envelops the collective bin sections 96. Throughout the enveloping space 97 refrigerants are circulated. In FIGURE 3 air is drawn from space 97 above bins 85 through a refrigerating and conditioning unit 100 and pumped out plenum openings 101 into a plenum 102 which combined with another adjacent plenum 102 and similar equipment direct a flow of air downward along one side 103 of storage facility 104. The effective control of the refrigerating process is handled by regulating: the refrigerant circulated throughout the refrigeration unit; the speed of the circulating fans (not shown) of the refrigerating unit 100, and the selective opening and closing of diverter valves 106 located in the plenum 102 sides. The top of plenum 102 and top of storage facility 104 are not shown for purposes of clarity. At the corner 107 of building 118, plenum 102 discharges into vertical orientated passageways 108 which thereafter discharge the refrigerated air laterally across the building ends 110. Air passing down the side of building 103 is diverted at the bottom and travels laterally across the building below bins 85. On opposite side 112 of the building all refrigerated air which has crossed the building laterally below the bins and across each end is collected and returned to the top of the building within the main plenum chamber 113 formed between the bin tops and the roof structure (not shown) for its subsequent re-entry through refrigeration unit to commence the circulation cycle once again. The resulting size of plenum chamber 113 is dictated by the need for access by personnel to service distribution system 80 or 90 and to enter respective bins 85 through hatch openings 87 as required from time to time for inspection and maintenance of the enclosed area. To the extent possible, enveloping space 97 is subdivided into flow channels 115 and these channels result from structural arrangement of the exterior building construction 118.

The preferred construction of building 118, with interior bins 85 and accessories is set forth in the following building and equipment specifications.

Foundation

The foundation of floor 120 is of well-drained earth, including a drain field composed of four-inch drain tile 121 twenty feet on center located approximately three feet below the finished floor line. Twelve inches below the finished floor line there is a heat grid made of plastic tubing 122 three-quarters of an inch in diameter and four feet on center through which may be circulated a fluid controlling the earth temperature below the floor. Such control is needed to prevent serious frozen ground upheavals and to assist the circulating air flow when required. Above this heat grid, pure sand is placed to complete the earth foundation. Pilasters 124 are used for the surrounding concrete wall 125 and these are placed on concrete blocks 126 six feet square and two feet thick placed twenty feet on center.

Construction of the walls and roof

The pilasters 124 are pre-cast and are twelve inches square using box-type reinforcing steel rods 127 one inch in diameter. When they are cured they are set on foundation blocks located twenty feet on center. The walls 125 are of a tilt-up reinforced concrete construction made four inches thick and twenty feet tall. All joints between walls 125 and the pilasters 124 are filled to insure waterproofing and the entire building 118 is finished on the outside with a suitable waterproof material. Wall sections might also be constructed of concrete blocks which are sealed.

The preferred roof (not shown) is of a curved construction, using wood laminated beams which are placed on pilasters. Roof beams are spaced by two by twelve purlons (not shown). Roofing of paper and cold adhesives are supported by five-eighths exterior plywood sheeting. Top roof coating is an aluminum asphalt base material.

Insulation

Insulation materials are used extensively throughout the building to reduce refrigeration requirements to a minimum. Polystyrene insulation 128 is used in two layers, three inches thick throughout the building, with the exception that no insulation is used under floor 120. The first layer of insulation is secured to building structures 118 by nailing to wood materials and by using hot tar emulsions on concrete materials. The second layer is secured by using both hot tar emulsion materials and wood skewers (not shown).

Floor construction

The floor 120 is supported above sand earth by first using four by six sills 130 which are subsequently spanned by two by four joists 131. The final floor 120 is made of two layers of plywood, the first layer being five-eighths inch thick and the second layer being three-quarters of an inch thick to form the finished floor of bins 85.

Construction of the bins

The bins 85 which are grouped in the interior of storage facility 104 have outside walls 133 made of three-eighths inch interior plywood supported on their sides by two by four studding 134 sixteen inches on center. The studding is raised vertically adjacent to or on two by four floor joists 131. End walls 135 of the bins are three-eighths inch plywood supported by two by four studding 136 running horizontally as indicated in FIGURE 3. By arranging the bin wall studding 134 and 136 in this manner, continuous air wall 97 surrounding passages 115 are formed. Plenum chambers 102 forming air ducts which extend the entire length of one side of building 118 referred to as the pressure side, are made of three-eighths inch plywood. It will be noted the air forced around the building circulates between polystyrene insulation 128 and plywood sheeting 133 and 135. In one specific building, like the one shown in FIGURE 3 twenty-four bins 85 are used; each bin 85 being sixteen feet four inches square and twenty-one feet tall.

The remaining bin walls, the inner walls, which do not serve as exterior walls adjacent to the air flow, are constructed by using three-quarter inch plywood 138 held in grooves of six by six posts 139. Tops 140 of bins 85 are constructed of two by ten joists (not shown) on sixteen inch centers covered with one layer of three-quarter inch plywood. All joints between plywood, posts, ceilings and floors 142 are covered with a glass tape (not shown), and thereafter all surfaces are covered with two coats of epoxy resin type material, such as polyurethane, sold under a trade name of "Magna"-Laminar X-500. This bin interior sealing insures there will be substantially no moisture content change within filled bin 85 interiors during bulk frozen food storage periods, thereby effectively reducing any food dehydration tendencies. In the ceiling of each bin are four small six and one-half inch diameter hatch 83 covered recesses 84 and also one large sixteen by twenty-four inch rectangular access opening 87 with a hatch cover 86. All these hatch covers are equipped with sealing gaskets (not shown).

Refrigeration

Automatic defrosting refrigeration units 100 each coupled with a ten-horsepower fan (not shown) discharging through openings 101 are used to supply air under pressure as the moving refrigerant forced evenly through the enveloping air space 97. This conditioned air is directed to the pressure side of the building in plenums 102, down wall 103, across storage facility 104 and up the other wall 112, as indicated by flow arrows in FIGURE 3. One or more refrigeration units 110 are used, each individually controlled by a thermostat pickup 150 and its control leads 151 placed in its respective operating area. The refrigeration equipment is designed to maintain subzero temperatures upon the recommended setting of thermostats 150. A control panel 152 is provided with leads 153 providing a central point for all controls responsive to thermostat pickup 150. Pipe lines 155, 156 handle the refrigerant circulated to and from one or more heat exchangers (not shown) located on the exterior of building 118 and heat exchangers in the interior refrigeration units 100.

Conveying system

The bins are filled and emptied by the use of pneumatic equipment systems 80, 90. A positive or pressure pneumatic system 81, 91 is used for filling bins 85, and a negative or vacuum pneumatic system 82, 93 is used for unloading bins, directing free flowing frozen food items to filling equipment 40, 42, mixing rooms (not shown) or bulk type equipment 50, 51, 52, 53, 45, 47, 49, as shown in FIGURES 1 and 2.

Electrical

All electrical equipment is of waterproof installation including general lighting circuits (not shown) and control systems 150, 152 associated with refrigeration units 100 and the included diverter valve 106 actuators (not shown).

Movable storage facility

In FIGURE 4, a movable storage facility is illustrated related to railroad transportation equipment. The structure and systems shown are suitable also for highway and waterway transportation equipment shown in FIGURE 1.

Within a substantially conventional exterior construction of a railway car 160, an insulation material 128 is used as a complete lining. A polystyrene material is preferred, as noted in describing the stationary facility. Likewise, immediately adjacent to this interior insulation lining 128, a complete enveloping space 161 is provided. The interior boundary of this space 161 is formed of exterior bin wall structure 162 which is fabricated of materials suitable for both railway car construction and bulk frozen food bin construction. The interior of the box-like interior bin wall structure 162 is divided into various bins 164 by suitable vertical partitions 165.

Each bin 164 at its center has a multiple purpose top opening structure 166 containing a limited access 167 for pneumatic distribution system (90) separator (70) component end 71. Also rotation and sealing caps 168 are included on funnel-like structure 169 to both close and open this pneumatic equipment access 167. If operating personnel must enter bins 164, the opening structure 166, including its lower larger diameter access flange cover 172, is released by turning fasteners 171 and lifted to one side clearing a larger access hole 170.

The exterior roof 173 of railway car 160 has a continuous centerline access 174 covered by slidable sections 175 guided by supports 176. One or more sections 175 are removable or tiltable permitting sliding movement of remaining sections 175. All are securely locked in place by fasteners 177 projecting into support recesses 178 when railway car 160 is en route to and from the frozen food processing plant 10.

Throughout the complete enveloping space 161, commencing at the top of railway car 160 just below the roof 173 with its access 174 and continuing down one side 180, across both ends 181 and bottom 182 and then back up other side 183, a complete refrigerant circulating piping system 185 is installed. Both a large higher pressure side delivery refrigerant manifold 186 and a large lower pressure side return refrigerant manifold 187 are located on bin tops and at respective inside railway car corners 188. These manifolds are connected to recirculating refrigerating equipment (not shown) mounted on railway car 160.

The preferred zero temperature of railway cars enveloping space 161 is regulated and maintained as circulating refrigerant, passing within manifolds 186, 187 and side 190, bottom 191, and end 192 smaller refrigerant lines, removes heat from ambient air in the enveloping space 161. The refrigeration media circulated is preferably ammonia, nitrogen, or similar closed system refrigerant.

The interiors of each bin 164 of railway car 160 are completely sealed. Glass tape (not shown) and epoxy resins 194 may be used. Such sealing, using these or other suitable materials, like sealing the stationary storage bins 85 insures there will be substantially no moisture content change within the filled bin 164 interiors during bulk frozen food storage periods. This moisture content control effectively reduces any food dehydration tendencies.

A frozen food processing plant 10 as illustrated in FIGURE 1, having the general arrangement of product flow as indicated, utilizes pneumatic food handling equipment and both stationary and movable bulk storage facilities very extensively to substantially reduce costs of processing, storing and delivering frozen food items. To the extent possible accessory equipment is installed out of the way of general frozen food processing spaces, such as the upper floor 196 locations for heating units 197, pumps 198, heat exchangers 199 and compressors 200.

However, both the directional flexibility offered by the pneumatic food handling equipment and the various dimensional approaches to the bulk storage facilities, result in the illustrated apparatus being readily adapted to existing frozen food processing plants. The purpose of the invention with respect to any plant layout and operation is to provide the food processing plant manager and his supervising personnel with a method and complete apparatus for processing, handling, storing, and transporting frozen foods at minimum cost by utilizing pneumatic distribution systems and multiple interim, sealed and refrigerant enveloped bulk frozen food storage bin facilities which are either stationary in or near the plant or movable as integral or insertable sections of trucks, railway cars and/or ships.

I claim:
1. A storage facility for frozen bulk foods, comprising:
   at least one inner chamber of air-moisture tight construction;
   an outer chamber completely encompassing the inner chamber structure and held at a spaced distance therefrom establishing an enveloping refrigerant circulating space;
   refrigerating equipment inclusive of components controllably circulating refrigerants in the enveloping refrigerant circulating space about the inner chamber structure;
   means defining an access opening to the inner chamber, open during loading and unloading times of the inner chamber, and means for closing said opening during dead storage times of frozen foods; and
   pressure differential passageway structures passing through the outer chamber and terminating in the inner chamber and used during loading and unloading of frozen bulk foods to guide frozen foods.

2. A storage facility for frozen bulk foods, as claimed in claim 1, comprising pneumatic pressure changing units used in conjunction with the pressure differential passageway structures.

3. A storage facility for frozen bulk foods as claimed in claim 1, comprising multiple passageway structures within the enveloping refrigerant circulating space to guide the circulating refrigerant.

4. A storage facility for frozen bulk foods, comprising:
   at least two inner chambers of air-moisture tight construction, each inner chamber having at least one surface contacting a surface of an adjacent inner chamber;
   an outer chamber completely encompassing the inner chambers and held at a spaced distance therefrom establishing an enveloping refrigerant circulating space;
   means forming multiple passageway structures within the enveloping refrigerant circulating space to guide a circulating refrigerant about the exterior of said inner chambers, and refrigerating means for circulating a refrigerant in these refrigerant multiple passageway structures;
   means forming access openings to all inner chambers, open during loading and unloading of specific chambers, and means for closing said openings during dead storage times of frozen foods;
   pressure differential passageway structures passing through the outer chamber and terminating in the inner chamber and used during loading and unloading of frozen bulk foods to guide frozen foods; and
   pneumatic pressure changing units used in conjunction with the pressure differential passageway structures.

5. A storage facility for frozen bulk foods, as claimed in claim 4, having an enlarged accessible enveloping refrigerant circulating space above the inner chamber structure to accommodate servicing personnel.

6. A storage facility for frozen bulk foods, as claimed in claim 4, having complete air-moisture tight coating linings throughout the inside of said inner chambers.

7. A storage facility for frozen bulk foods, as claimed in claim 4, having heavy duty insulation liners inside the outer chamber in non-interference positions with the circulating refrigerant means.

8. A storage facility for frozen bulk foods, as claimed in claim 4, having exterior covered access means in the outer chamber.

9. A storage facility for frozen bulk foods, as claimed in claim 4, having a foundation structure serving as the framing of moving transportation equipment.

10. A storage facility for frozen bulk foods, as claimed in claim 4, having a foundation structure of prepared earth, support means on the prepared earth for supporting the inner chamber in spaced relation above said prepared earth, drain tile in the prepared earth, and a heat grid means in the prepared earth to conduct heat to prevent earth freezing upheavals.

References Cited by the Examiner

UNITED STATES PATENTS

| | | | |
|---|---|---|---|
| 2,336,125 | 12/1943 | Preble | 99—193 |
| 2,364,049 | 12/1944 | Bensel | 99—193 |
| 2,553,471 | 5/1951 | Protzeller | 62—405 |
| 2,702,458 | 2/1955 | Del Mar | 165—169 X |
| 2,731,807 | 1/1956 | Allyne | 165—30 X |
| 2,874,554 | 2/1959 | Elfving et al. | 62—405 |
| 2,954,680 | 10/1960 | Ruff | 165—45 X |
| 3,089,313 | 5/1963 | Fix | 62—239 |
| 3,127,755 | 4/1964 | Hemery | 62—405 X |

JAMES W. WESTHAVER, *Primary Examiner.*

A. LOUIS MONACELL, CHARLES SUKALO,
*Examiners.*

R. N. JONES, M. A. ANTONAKAS,
*Assistant Examiners.*